US010460505B2

(12) United States Patent
Overbeck

(10) Patent No.: US 10,460,505 B2
(45) Date of Patent: Oct. 29, 2019

(54) SYSTEMS AND METHODS FOR LIGHTFIELD RECONSTRUCTION UTILIZING CONTRIBUTION REGIONS

(71) Applicant: GOOGLE LLC, Mountain View, CA (US)

(72) Inventor: Ryan Overbeck, Mountain View, CA (US)

(73) Assignee: GOOGLE LLC, Moun, CA (US)

( * ) Notice: Subject to any disclaimer, the term of this patent is extended or adjusted under 35 U.S.C. 154(b) by 43 days.

(21) Appl. No.: 15/395,278

(22) Filed: Dec. 30, 2016

(65) Prior Publication Data

US 2018/0190006 A1    Jul. 5, 2018

(51) Int. Cl.
*G06T 15/00* (2011.01)
*G06T 15/06* (2011.01)
*G06T 15/50* (2011.01)

(52) U.S. Cl.
CPC ............ *G06T 15/06* (2013.01); *G06T 15/503* (2013.01); *G06T 15/506* (2013.01); *G06T 2200/21* (2013.01)

(58) Field of Classification Search
CPC .............. G06T 15/06; H04N 13/0207; H04N 13/0007; H04N 5/2351
USPC ........................................................ 345/419
See application file for complete search history.

(56) References Cited

U.S. PATENT DOCUMENTS

| | | | |
|---|---|---|---|
| 6,023,523 A | 2/2000 | Cohen et al. | |
| 6,097,394 A | 8/2000 | Levoy et al. | |
| 6,476,805 B1 | 11/2002 | Shum et al. | |
| 8,155,456 B2 * | 4/2012 | Babacan | H04N 5/772 345/426 |
| 8,189,065 B2 * | 5/2012 | Georgiev | G03B 15/00 348/222.1 |
| 8,379,105 B2 * | 2/2013 | Georgiev | G03B 15/00 348/222.1 |
| 8,380,060 B2 * | 2/2013 | Georgiev | G03B 15/00 396/332 |

(Continued)

FOREIGN PATENT DOCUMENTS

WO    2008041061 A    4/2008

OTHER PUBLICATIONS

Lumsdaine A, Georgiev T. Full resolution lightfield rendering. Indiana University and Adobe Systems, Tech. Rep. Jan. 2008;91:92.*

(Continued)

*Primary Examiner* — Phu K Nguyen

(57) ABSTRACT

A method for rendering a view from a lightfield includes identifying a ray associated with a portion of the view and selecting a set of camera views from a plurality of camera views representing the lightfield based on an intersection point of the ray with a plane. Each camera view has an associated contribution region disposed on the plane. The associated contribution region overlaps contribution regions associated with other camera views of the set of camera views at the intersection point. The method also includes determining a characteristic of the ray based on a contribution factor for each camera view of the set of camera views. The contribution factor is determined based on the relative position of the intersection point within the associated contribution region.

16 Claims, 11 Drawing Sheets

(56) References Cited

U.S. PATENT DOCUMENTS

| | | | | |
|---|---|---|---|---|
| 8,401,316 | B2* | 3/2013 | Babacan | H04N 5/772 |
| | | | | 345/426 |
| 8,488,887 | B2* | 7/2013 | Reme | H04N 19/172 |
| | | | | 375/240.12 |
| 9,129,183 | B2* | 9/2015 | Venkataraman | G06T 9/00 |
| 9,412,206 | B2* | 8/2016 | McMahon | G06T 19/20 |
| 9,414,013 | B2* | 8/2016 | Kenoyer | H04L 29/06027 |
| 9,576,369 | B2* | 2/2017 | Venkataraman | |
| | | | | H01L 27/14618 |
| 9,800,856 | B2* | 10/2017 | Venkataraman | H04N 13/0007 |
| 9,811,753 | B2* | 11/2017 | Venkataraman | G06T 9/00 |
| 9,854,176 | B2* | 12/2017 | Sanders | H04N 5/2351 |
| 9,936,187 | B2* | 4/2018 | Paulus, Jr. | H04N 13/0207 |
| 10,009,538 | B2* | 6/2018 | Venkataraman | H04N 5/225 |

OTHER PUBLICATIONS

Isaksen A, McMillan L, Gortler SJ. Dynamically reparameterized light fields. InProceedings of the 27th annual conference on Computer graphics and interactive techniques Jul. 1, 2000 (pp. 297-306). ACM Press/Addison-Wesley Publishing Co.*

Tomasi C, Kanade T. Shape and motion from image streams under orthography: a factorization method. International Journal of Computer Vision. Nov. 1, 1992;9(2):137-54.*

Tolosa A, Martínez-Cuenca R, Pons A, Saavedra G, Martínez-Corral M, Javidi B. Optical implementation of micro-zoom arrays for parallel focusing in integral imaging. JOSA A. Mar. 1, 2010;27(3):495-500.*

Marti M, Hsieh PY, Doblas A, Sánchez-Ortiga E, Saavedra G, Huang YP. Fast axial-scanning widefield microscopy with constant magnification and resolution. Journal of Display Technology. Nov. 2015;11(11):913-20.*

Invitation to Pay Additional Fees and, Where Applicable, Protest Fee dated Mar. 6, 2018 for PCT Application No. PCT/US2017/059058, 16 pages.

Zhang C., et al., "A survey on image-based rendering-representation, sampling and compression", Signal Processing, Image Communication, Elsevier Science Publishers, Amsterdam, NL, vol. 19, No. 1, Jan. 1, 2004, pp. 1-28.

Marc Levoy, et al., "Light Field Rendering", Computer Graphics Proceedings, SIGGRAPH '96, ACM, New York, US, Aug. 1, 1996, 12 pages.

Asma Al-Saidi, et al, "On-demand transmission model for remote visualization using image-based rendering", Concurrency and Computation: Practice and Experience, vol. 24, No. 18., Dec. 25, 2012, 18 pages.

Z. Lin and H. Shum, "A Geometric Analysis of Light Field Rendering", International Journal of Computer Vision, vol. 58, No. 2, 2004, 18 pages.

A. Davis, M. Levoy and F. Durand, "Unstructured Light Fields", Eurographics, vol. 31, No. 2, 2012, 10 pages.

P. Sloan, M. Cohen and S. Gortler, "Time Critical Lumigraph Rendering", Proceedings of the 1997 Symposium on Interactive 3D Graphics (I3D), Apr. 27-30, 1997, Providence, RI, 8 pages.

H. Pfister, M. Zwicker, J. Van Baar, and M. Gross, "Surfels: Surface Elements as Rendering Primitives", 27th Annual Conference on Computer Graphics and Interactive Techniques, SIGGRAPH 2000, New Orleans, LA, 8 pages.

C. Buehler, M. Bosse, L. McMillan, S. Gortler, and M. Cohen, "Unstructured Lumigraph Rendering", 28th Annual Conference on Computer Graphics and Interactive Techniques, SIGGRAPH, Aug. 12-17, 2001, Los Angeles, CA, 8 pages.

International Search Report and Written Opinion of the International Searching Authority for PCT Application No. PCT/US2017/059058, 21 pages.

Written Opinion of the International Preliminary Examing Authority dated Nov. 15, 2018 for corresponding International Application No. PCT/US 2017/059058, 10 pages.

Ng, Ren "Digital Light Field Photography," Dissertation submitted to the Department of Computer Science at Stanford University; Jul. 2006; 203 pages. Accessed on Dec. 5, 2018 at <<https://stanford.edu/class/ee367/reading/Ren%20Ng-thesis%20Lytro.pdf>>.

International Preliminary Report on Patentability dated Jul. 11, 2019 for corresponding International Application No. PCT/US2017/059058, 12 pages.

* cited by examiner

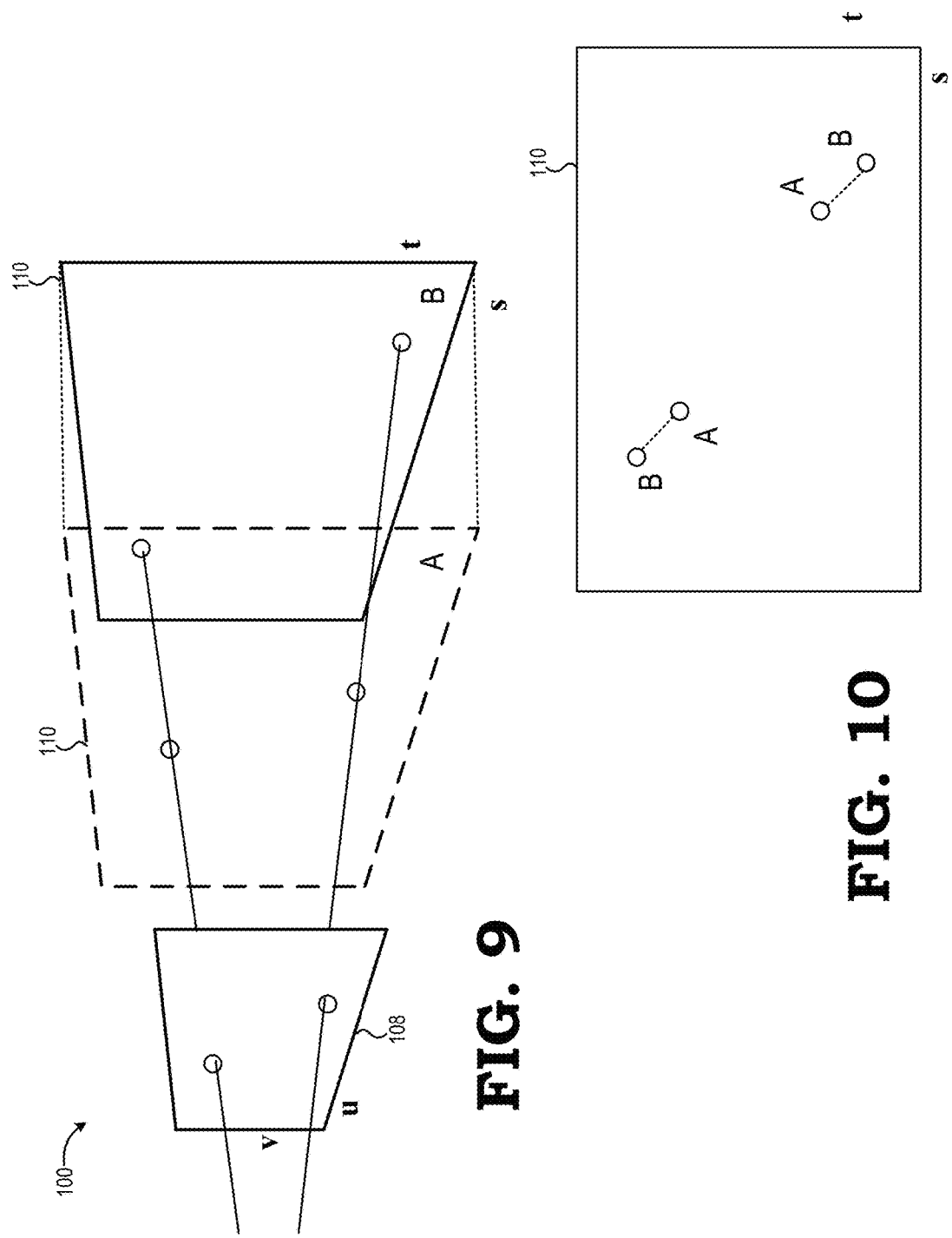

US 10,460,505 B2

SYSTEMS AND METHODS FOR LIGHTFIELD RECONSTRUCTION UTILIZING CONTRIBUTION REGIONS

BACKGROUND

Virtual reality (VR) and augmented reality (AR) applications often seek to enable a user to move throughout a scene (virtual or real-world) and enable the user to view the scene from the current pose of the user's head mounted device (HMD) or other VR/AR viewing device. Lightfields have been proposed as a light content format to enable rendering of imagery of a scene from many different views. However, a lightfield suitable for realistic depiction can utilize considerable amounts of processing resources, including a considerable number of processing cycles of a central processing unit (CPU) and a graphics processing unit (GPU). The amount of resources required for use of lightfields for VR and AR applications often is particularly problematic for mobile consumer devices due to their relatively limited storage, transmission, and processing resources.

BRIEF DESCRIPTION OF THE DRAWINGS

The present disclosure may be better understood, and its numerous features and advantages made apparent to those skilled in the art by referencing the accompanying drawings.

FIG. 9 and FIG. 10 are diagrams illustrating an example of altering a focus of a view in the lightfield in accordance with some embodiments.

The use of the same reference symbols in different drawings indicates similar or identical items.

DETAILED DESCRIPTION

The following description is intended to convey a thorough understanding of the present disclosure by providing a number of specific embodiments and details involving rendering views in a lightfield. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

A lightfield (also known as a lumigraph or photic field) may be conceptualized as the amount of light flowing in every direction through every point in a defined space or environment, wherein the direction of each ray in the lightfield is specified by a five-dimensional plenoptic function and the magnitude of each ray is specified by a corresponding radiance. A common approach to parameterizing a lightfield for computer-graphics implementations is via a two-plane parameterization, in which a lightfield is represented as a collection of perspective images of an st plane (often referred to as the "focal plane"), with each image representing the perspective of a virtual camera from a corresponding position on a uv plane (often referred to as the "camera plane") that is parallel to the st plane.

Figure 1:
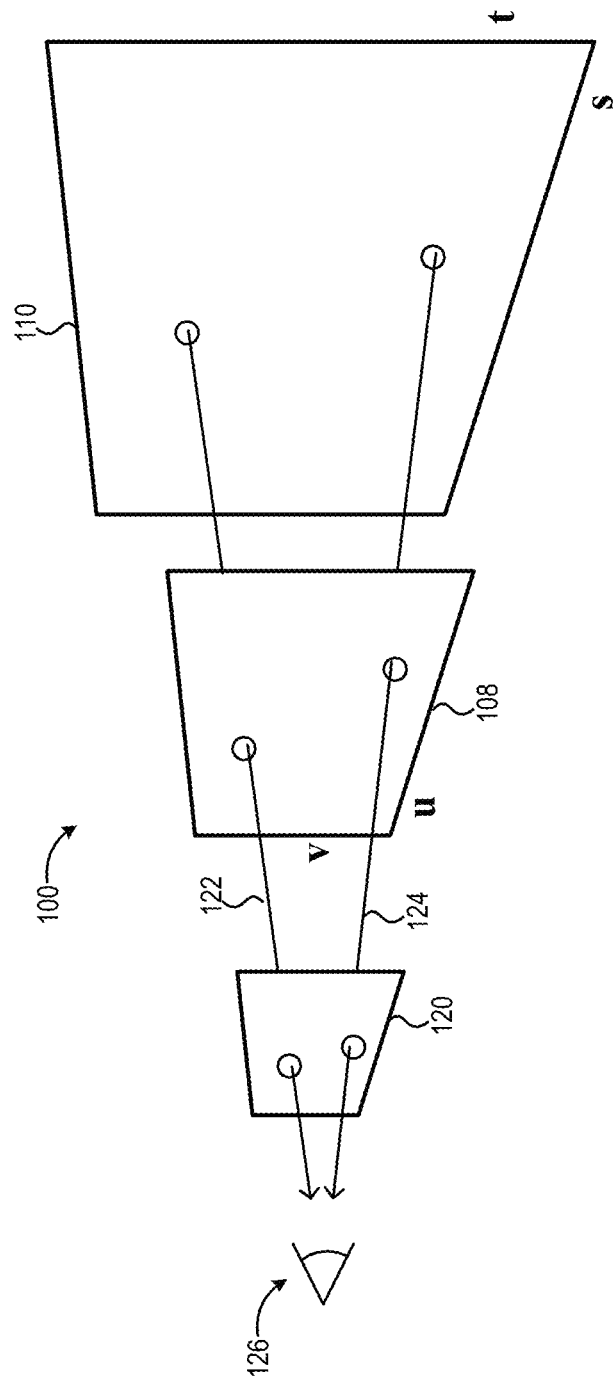
FIG. 1 and FIG. 2 are diagrams of an example lightfield representation in accordance with some embodiments.

As illustrated in FIG. 1, a view from the perspective of an observer 126 can be rendered utilizing arrays of images associated with a surface, such as a planar surface, e.g., a focal plane 110. The view of the observer 126 can be constructed from rays (e.g., ray 122 and ray 124) extending from the surface (e.g., focal plane 110) to the observer 126. While the surfaces (e.g., the focal plane 110 or the camera plane 108 described below) are illustrated as planes, the surfaces can have the form of other non-planar manifolds.

In the illustrated embodiment of FIG. 1, the direction of the rays is expressed in terms of intersection points of the rays on two parallel planes (e.g., a camera plane 108 and the focal plane 110). In an example, the camera plane 108 having the designated coordinates "u" and "v" and the focal plane 110 having the designated coordinates "s" and "t" are utilized to specify the direction of a ray extending between the focal plane 110 and the observer 126, through the camera plane 108.

The view of an observer 126 is displayed on a display device 120. Portions of a view to be displayed on the display device 120 are rendered based on characteristics of a ray (e.g., ray 122 or ray 124) extending between the focal plane 110 and the observer 126, through the camera plane 108 and the modeled display device 120. While a single display and observer are illustrated, more than one display device can be used. For example, two display devices, one for a left-eye view and one for a right-eye view, can be used and views or images can be rendered for each eye of the observer. A portion of the view can be a pixel or a set of pixels. In an example, the characteristic includes radiance. In a further example, the characteristic can include a color value or alpha.

The characteristics of the ray can be determined based on corresponding portions of camera views. A selection of a subset of cameras or camera positions can be associated with a ray based on an intersection of the ray with the camera plane 108. Camera views associated with the subset of cameras or camera positions are selected based on the intersection of the ray with the focal plane 110. In an example, a two-dimensional array of camera positions can be associated with the camera plane 108. A two-dimensional array of camera views can be associated with a camera position from the plane 108 and camera view positions on the focal plane 110. For example, a two-dimensional array of camera views in the focal plane 110 is uniquely associated with each camera position of the array of camera positions associated with the camera plane 108.

While the focal plane 110 and camera plane 108 are illustrated as being planar, other non-planar manifolds can be used. For example, cameras in the camera plane 108 can be arranged on a sphere, with the cameras facing outward. A viewer can be anywhere inside of the sphere, and any view can be reconstructed from inside the sphere. In such an example, there are several ways to represent the focal plane onto which to project the lightfield images: the camera view images can be projected onto a sphere larger than the sphere of cameras, the camera view images can be projected onto a single plane that is in front of the viewer, or the camera view images can be projected onto planes in front of each camera or camera position, among others. The methods described herein allow for various non-planar manifolds on which a camera array is distributed or camera view images are projected, offering different user viewing experiences.

Figure 2:
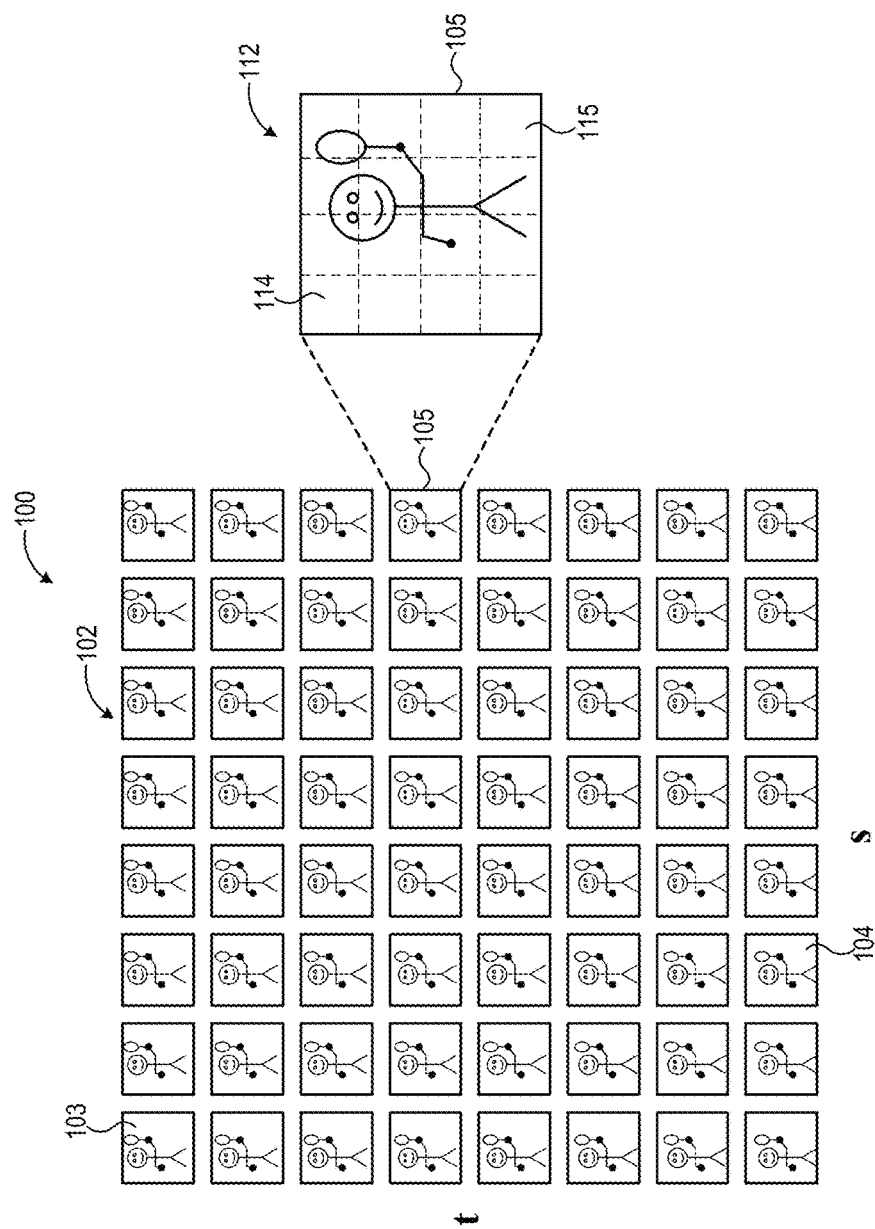

FIG. 2 illustrates a typical two-plane representation of a lightfield in accordance with some embodiments. An example lightfield 100 is composed of a two-dimensional (2D) array 102 of images (e.g., images 103, 104, 105), also referred to herein as camera views, wherein each image of the array 102 represents the rays arriving at a corresponding point (e.g., point 106) on a camera plane 108 (having dimensions "u" and "v") from all points on a focal plane 110 (having dimensions "s" and "t"). In such implementations, the images (camera views) of the array 102 represent off-axis, or sheared, perspective views of a scene or environment. Thus, the 2D array 102 may be represented as an array of images, with each image i having a position in the array defined by the coordinate ($s_i$, $t_i$). Further, each image is represented by a 2D array of pixels. The array of pixels of an image may be conceived as an array of image tiles, with each image tile representing a corresponding pixel region. To illustrate with reference to image 105, each image is composed of, for example, a 4×4 array of tiles (e.g., tiles 114, 115). While tiles 114 and 115 are illustrated as quadrilateral tiles, tiles can have a polygonal shape, for example, triangular. Each tile (e.g., tiles 114, 115) can be sent separate from the other tiles to central and graphical processing units for rendering.

Thus, as shown by lightfield 100 of FIG. 2, a lightfield may be represented by an array of images or camera views of a scene, with each image representing a slightly planar-shifted perspective of the scene relative to the perspectives of the other images of the lightfield. Often, a lightfield contains a relatively large number of such images, and these images may be rendered or captured in relatively high resolution.

When rendering a view from a lightfield, portions of the view are rendered based on the characteristics of rays extending to the observer 126 from the camera plane 108 and focal plane 110. The characteristics of each ray are determined based on a subset of images or camera views. The camera views are associated with camera positions and are selected based on an intersection of the ray with contribution regions associated with camera positions on the camera plane 108 and based on an intersection of the ray with the focal plane 110.

In an embodiment, a subset of camera positions and associated camera views can be selected based on a position of the intersection of the ray with contribution regions associated with each camera position in the camera plane 108. In an alternative embodiment, contribution regions can be associated with each camera view in the focal plane 110. The characteristics of the ray (e.g., radiance, color value, or alpha) can be determined based on weighted contributions of camera views associated with each of the subset of camera positions having contribution regions overlapping the intersection of the ray within the camera plane 108. For example, the characteristics of the ray can be determined based on a sum of weighted characteristics derived from the camera views associated with the selected camera positions. Weights, also referred to as contribution factors, associated with the camera views can be determined based on the relative position of the ray intersection within the contribution region. Optionally, the weights (contribution factors) associated with the contributions can be normalized, for example, using a sum of contribution factors of the selected camera views.

Figure 3:
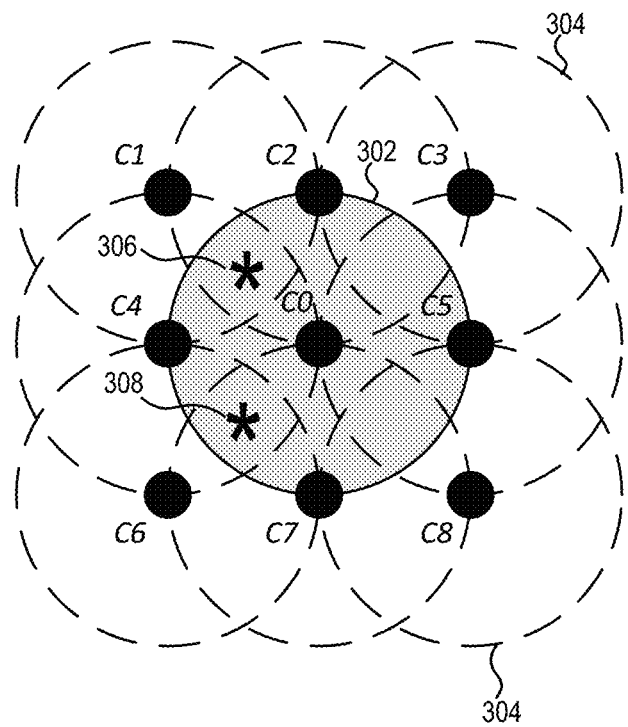
FIG. 3 is a diagram of an example camera plane in accordance with some embodiments.

For example, as illustrated in FIG. 3, camera positions within an array of camera positions associated with the camera plane 108 can have associated contribution regions 302 or 304. While the contribution regions 302 or 304 are illustrated as being circular disks, the contribution regions can have other shapes. For example, the contributions can be circular, elliptical, quadrilateral, or polygonal disks.

As illustrated, a ray intersects the camera plane at a position (e.g., position 306 or position 308). Camera positions having contribution regions overlapping the intersection position are selected to provide a subset of camera positions. The subset of camera positions is used to select camera views that are used to determine characteristics of the ray. For example, a ray intersecting at position 306 can result in the selection of camera positions C0, C1, C2, and C4 based on the contribution regions overlapping with the position 306 of the intersection of the ray. In another example, camera positions C0, C4, C6, and C7 are selected when a ray intersects the camera plane at position 308.

Camera views can be selected based on the subset of camera positions and the projection of the ray onto the focal plane. Contributions from the camera views can be weighted based on the relative position of the ray intersection within the contribution region. For example, the weight or contribution factor of the contribution can vary with radial distance from the camera position within the contribution region. In an example, the contribution factor can vary from 1 to 0 in a smooth manner with increasing distance from the camera position. For example, a contribution can decrease linearly with increasing distance from the camera position. In another example, a contribution can decrease in a Gaussian relationship with radial distance from the camera position.

Figure 4:
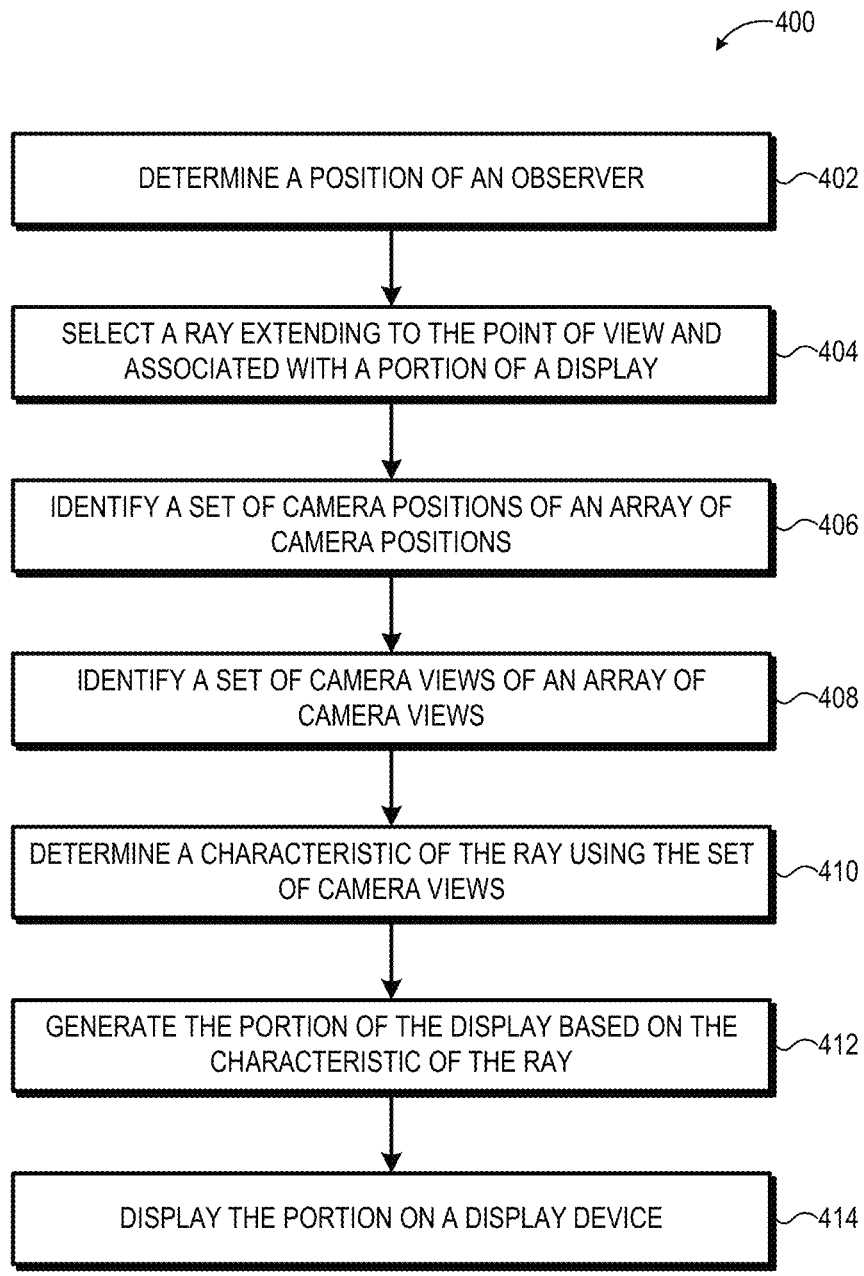
FIG. 4 is a block diagram illustrating an example method for rendering a view in the lightfield in accordance with some embodiments.

To further illustrate the rendering of a view using selected camera views, a method 400 illustrated in FIG. 4 includes determining a point of view of an observer, as illustrated at block 402. Based on the position and orientation of an observer, rays extending into the lightfield are utilized to render a view to be displayed to the observer and can be generated, for example, utilizing the four-dimensional coordinates disposed on two parallel planes, such as a camera plane and a focal plane.

As illustrated at block 404, to render a display image or view, a ray can be selected. The ray extends to the observer from the focal plane through the camera plane and through a display plane, representing the display device. The ray is associated with a portion of a view or image to be displayed. The portion of the view can be a pixel or can be a set of pixels. Characteristics of the ray can be utilized to reconstruct a portion of the display, such as specifying characteristics of light to be displayed by the pixel.

As illustrated at block 406, a set of camera positions of an array of camera positions can be identified. A select ray intersects with the camera plane. Camera positions having contribution regions overlapping with point of intersection of the ray within the camera plane can be selected. Contribution regions can be used to determine both which camera positions to associate with a ray and to determine a contribution factor to associate with camera views associated with the selected camera positions.

Based on the selected camera positions and the intersection of the ray with the focal plane, a set of camera views can be selected, as illustrated at block 408. Portions of the camera views associated with the portions of the view intersecting the ray can be utilized to generate characteristics of the ray, which are used in determining the portion of the view or displayed image.

As illustrated at 410, a characteristic of the ray can be determined using the set of camera views. In an example, the characteristic can include radiance, color value, or alpha. In particular, a portion is selected from each camera view that corresponds with the portion of the view or image associated with the ray, and the characteristic of the portion of the camera view is used when determining the characteristic of the ray. For example, a normalized weighted sum of characteristics of the portion of the selected camera views can be utilized to specify the characteristic of the ray.

The weight or contribution factor of the characteristic from each camera view can be determined based on a relative distance of a camera position associated with the camera view to the intersection point of the ray within the contribution region. Alternatively, the contribution factor can be determined based on a relative distance of a ray intersection with the focal plane and a position of the camera view within the focal plane. Each of the contribution factors can be normalized based on a sum of the contribution factors. For example, the contribution of each camera view to the characteristic of the ray is the product of the contribution factor associated with the camera view and a value of the characteristic of the portion of the camera view. The contribution of each selected camera view is added and optionally normalized based on the sum of contribution factors of the selected camera views.

In other words, the characteristic of the ray can be the sum of contributions from each camera view. The contribution from each camera view is determined by multiplying the contribution factor by the characteristic value of the camera view and dividing the product by a sum of each of the contribution factors to normalize the contributions. Alternatively, the products of each contribution factor and camera view value can be summed and the sum divided by the sum of each of the contribution factors for normalization.

As illustrated at block 412, the portion of the display image can be rendered based on the characteristic of the ray. For example, the radiance values associated with the characteristic of the ray can be applied to the portion of the display image. In a particular example, a pixel value can be set based on the characteristics of the ray.

The process of selecting a ray can be repeated for each portion of the display image. Rendered portions of the view or image can be displayed on a display device, as illustrated at block 414, and can represent a point of view of an observer.

Such an approach provides technical advantages, including utilizing less processor resources and accelerating the rendering of views or images to be displayed to an observer. For example, visibility computation and the render shaders are simpler and generally faster than conventional methods. The reconstruction filter is flexible and the method allows for a trade between edge doubling with depth of field aperture blur by altering the size of the contribution regions. The size and shape of the contribution region can be the size and shape of the bokeh. Accordingly, the contribution region an imitate a camera aperture.

Further, methods using contribution regions provide for improved adaptive lightfield level of detail. For example, the method allows for hierarchical level of detail rendering. For example, camera positions or associated contributions regions can be organized in a hierarchy. Example hierarchies include a kd-tree, octree, or bounding volume hierarchy (BVH), among others. In at least one embodiment, the images of a two-dimensional array of images representing a lightfield are organized into a binary tree structure.

The use of a hierarchy of contribution regions to identify camera views and determine the characteristics of a ray provides further advantages when adapting the level of detail. For example, the level of detail can be progressively enhanced while budget exists within the processing resources to render progressively more detailed views or images for display. In another example, an increasingly detailed view can be calculated as an observer is positioned closer to a scene. In a further example, progressively increasing levels of detail can be determined until a criteria is met.

Figure 5:
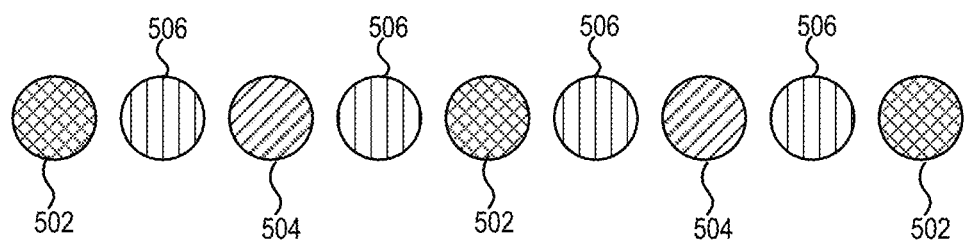
FIG. 5 is a diagram of an example camera hierarchy in accordance with some embodiments.

Conceptually, progressively greater detail can be provided by increasing camera density and the density or proximity of camera views or by utilizing increasingly higher resolution camera views, or both. For example, as illustrated in FIG. 5, camera density can be selectively changed by selecting subsets of camera positions. In an initial level of detail, camera positions 502 can be selected and camera views from the camera positions 502 can be utilized in determining the characteristic of the ray or rays. To increase the level of detail, additional cameras or camera positions can be added. For example, an intermediate level of detail can be generated using camera views from both camera positions 502 and 504. Optionally, at the intermediate level of detail, middle resolution images can be used for each of the camera views generated from camera positions 502 or 504. A further level of detail can be improved utilizing a greater density of cameras or camera positions, for example, utilizing the camera positions 502, 504, and 506 to select camera views useful in generating the characteristics of the rays. Optionally, when a higher number or density of cameras or camera positions are selected, higher resolution camera views can also be selected.

As described above, increasing camera density can be further augmented using progressively higher resolutions of camera views. For example, when generating characteristic of rays using camera positions 502, low resolution camera views can also be used. When utilizing an increased camera density, such as when using camera positions 502 and 504, a midrange resolution can be utilized for the camera views. In a further example, when a high-density configuration utilizing camera positions 502, 504, and 506 are used, higher resolution images can be utilized for the camera views. In an example, the sides of each image of higher resolution can be approximately twice the size of the preceding lower resolution image.

Such an approach can advantageously be used to provide improved image quality when permitted by a processor utilization budget or can be used to generate lower resolution images at an apparent distance and higher resolution images when the observer is in apparent close proximity.

Figure 6:
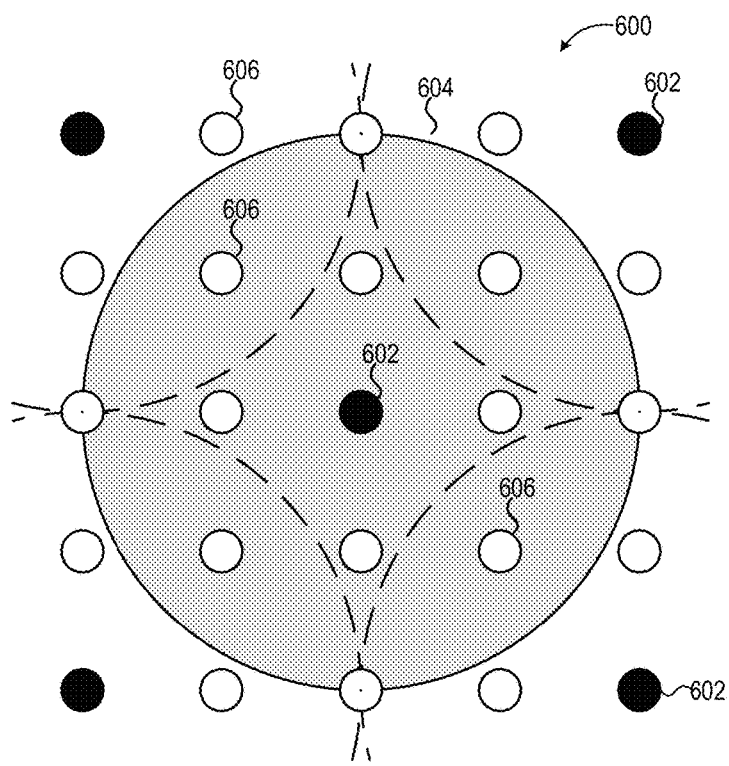
FIG. 6 and FIG. 7 are diagrams of example selection of cameras to implement camera hierarchies in accordance with some embodiments.

The further illustrate the utilization of a camera hierarchy, FIG. 6 illustrates a camera array 600 in which camera positions 602 are selected based on a selected level within a hierarchy. The camera positions 602 and camera views associated with camera positions 602 can be selected based on the intersection of a ray with the contribution region (e.g., contribution region 604) and the contribution factors of the associated camera views can be derived from a relative position of the intersection point of the ray with the camera plane and within the contribution region 604.

As illustrated, when selecting a subset or lower density arrangement of camera views or cameras 602, the contribution region 604 can be relatively large overlapping other camera positions 606 within the array that are not part of the selected level of the hierarchy. Optionally, low resolution camera views can be associated with the camera positions 602 when determining ray characteristics at the low-density level of the hierarchy.

Figure 7:
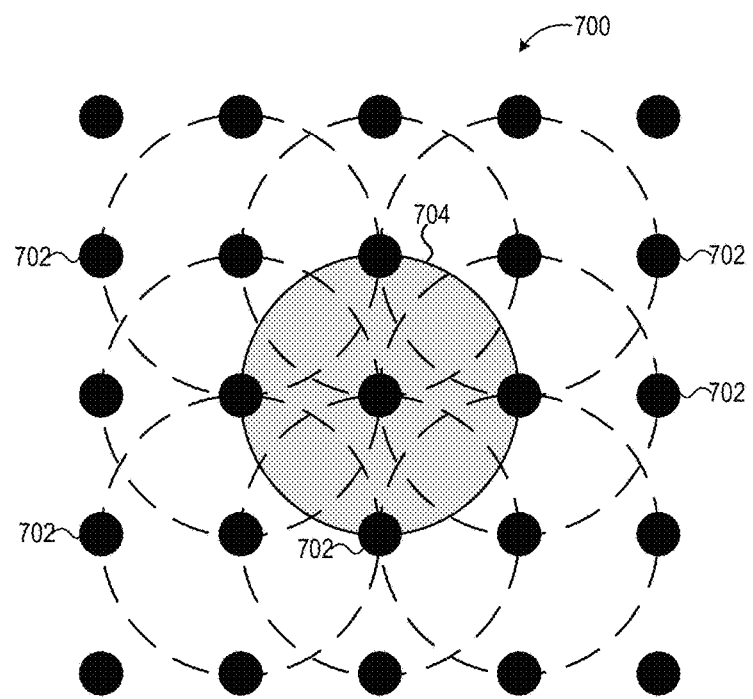

A higher level of detail can be achieved using an increased density of camera positions and optionally higher resolution camera views associated with those camera positions. For example, as illustrated in FIG. 7, a camera array 700 of camera positions 702 having a greater camera density than the selected camera positions 602 of the camera array 600 can be selected. A size of the contribution region 704 can be reduced to accommodate the higher density of camera positions selected for the array 700. Optionally, higher resolution images can be used as camera views to further enhance the level of detail to be rendered. As illustrated, the contribution region 704 is smaller than the contribution region 604.

Figure 8:
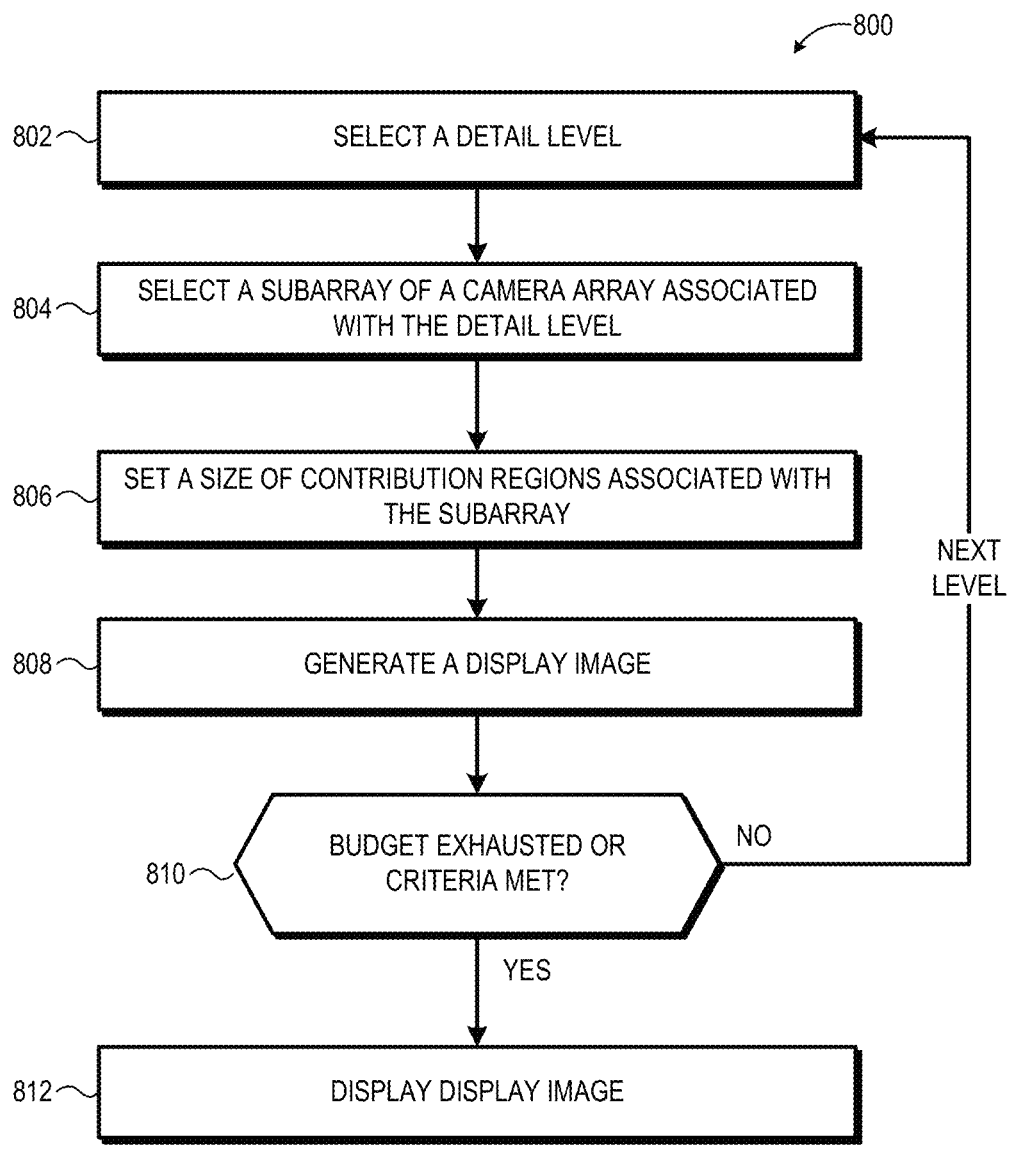
FIG. 8 is a block diagram illustrating an example method for rendering views in a lightfield in accordance with some embodiments.

For example, a method 800 illustrated in FIG. 8 can include selecting a detail level, as illustrated at block 802. Based on the selected detail level, a subarray of camera positions of the camera array can be selected, as illustrated at block 804. The subarray can include a lower density set of camera positions or can include less than all of the camera positions.

As illustrated at block 806, a size of the contribution regions associated with each camera position on the subarray can be set based on the density of the subarray. For example, the lower-density subarray of camera positions have contribution regions of greater size.

As illustrated at block 808, a view or display image can be rendered. For example, the view or display image can be rendered by determining rays associated with portions of the display image, selecting cameras or camera positions based on contribution regions intersecting with the selected rays, and determining characteristics of the rays based on weighted contributions from camera views associated with the selected camera positions. The ray characteristics can be utilized to render portions of the view or display image. Optionally, the view can be displayed on a display device, as illustrated at block 812.

Alternatively, an iterative process can be utilized to determine whether a criteria is met or whether a budget, such as a processing budget, has been exhausted, as illustrated block 810. For example, if a low-resolution view is rendered, the system can determine whether additional processing budget is available and can utilize additional processing budget to improve the level of detail of a view or image. For example, a more detailed level can be selected, as illustrated at block 802, a greater density camera subarray can be selected, as illustrated at block 804, smaller contribution regions can be set for the greater density subarray, as illustrated at block 806, and a more detailed display image or view can be rendered based on the increased density of the camera subarray and the associated camera views.

Other criteria can, for example, include relative distance of an observer from the camera plane or camera view plane, sharpness of an image, or functions that account for movement of the observer. As images or views having desirable levels of detail are rendered, the views or images can be displayed on the display device, as illustrated at block 812.

The above methods further advantageously allow for a more efficient generation of views having a change in focus. In an example, the focus of a view can be altered by changing the relative position of the focal plane 110 and the camera plane 108. For example, as illustrated in FIG. 9 and FIG. 10, focal positions of a view can be altered by moving the position of the focal plane 110 relative to the camera plane 108 to increase the distance or decrease the distance. For example, if a focal plan 110 is moved from position A to position B, the intersection of the ray with the camera plane 108 does not change. However, the position of the ray intersection with the focal plane 110 changes. For example, moving the focal plane 110 from position A to position B (FIG. 9) translates the intersection points in the focal plane 110 from points A to points B (see FIG. 10), which results in a different selection of camera views that contribute to the characteristics of the ray. When the contribution region resides in the camera plane, adjusting the relative distance of the focal plane maintains the selection of camera positions and contribution factors. The camera views are reselected. Alternatively, when contribution factors are based on the position of an intersection with a contribution region in the focal plane 110, the change in relative position of the focal plane 110 can result in different contribution factors associated with the camera views, while the selected camera positions remain constant.

Figure 11:
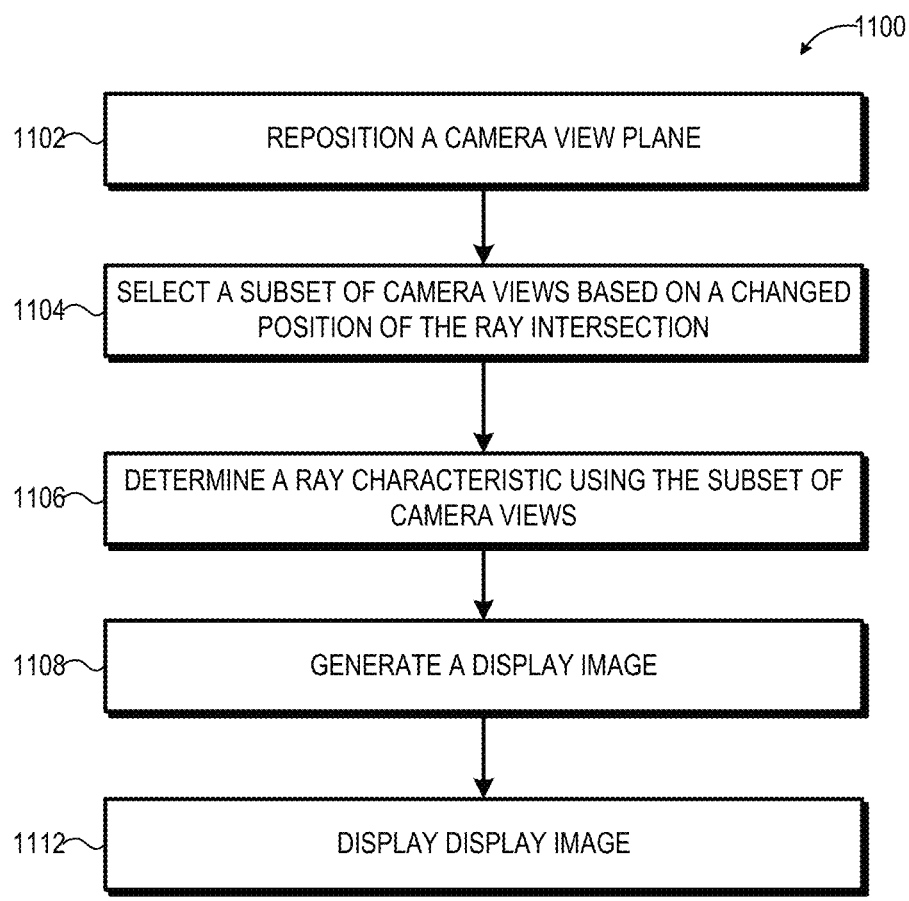
FIG. 11 is a block diagram illustrating an example method for altering a focus of a view in a lightfield in accordance with some embodiments

For example, a method 1100 illustrated in FIG. 11 includes repositioning a focal plane 110, as illustrated at block 1102. Based on the change in position of the intersection of a ray, a different subset of camera views is selected, as illustrated at block 1104. When the contribution regions are associated with the camera plane, selected camera positions and associated contribution factors remain constant, reducing the processing burden for changing a focus.

As illustrated at block 1106, ray characteristics can be determined using the revised subset of camera views. In particular, ray characteristics can be determined using a weighted combination of characteristics of portions of the revised subset of camera views. For example, a weighted sum of characteristics of the portions of the camera views can be used to determine the ray characteristics. The contribution factors can be determined based on the position of an intersection of the ray with a contribution region. In an example, the contribution factors are normalized based on a sum of contribution factors. In a particular example, the contribution factors are determined based on the position of the intersection of the ray with a contribution region in the camera plane. Alternatively, the contribution factors are determined based on the position of the intersection of the ray with a contribution region in the focal plane.

The process of selecting subsets of camera views based on the altered position of the ray intersection can be repeated to generate portions of a display image or view, as illustrated at block 1108. The display image or view rendered by the process can be displayed on a display device, as illustrated at block 1112.

In another example, the field of view and bokeh can be influenced by the size and shape of the contribution region. In particular, the contribution region can imitate camera aperture.

Figure 12:
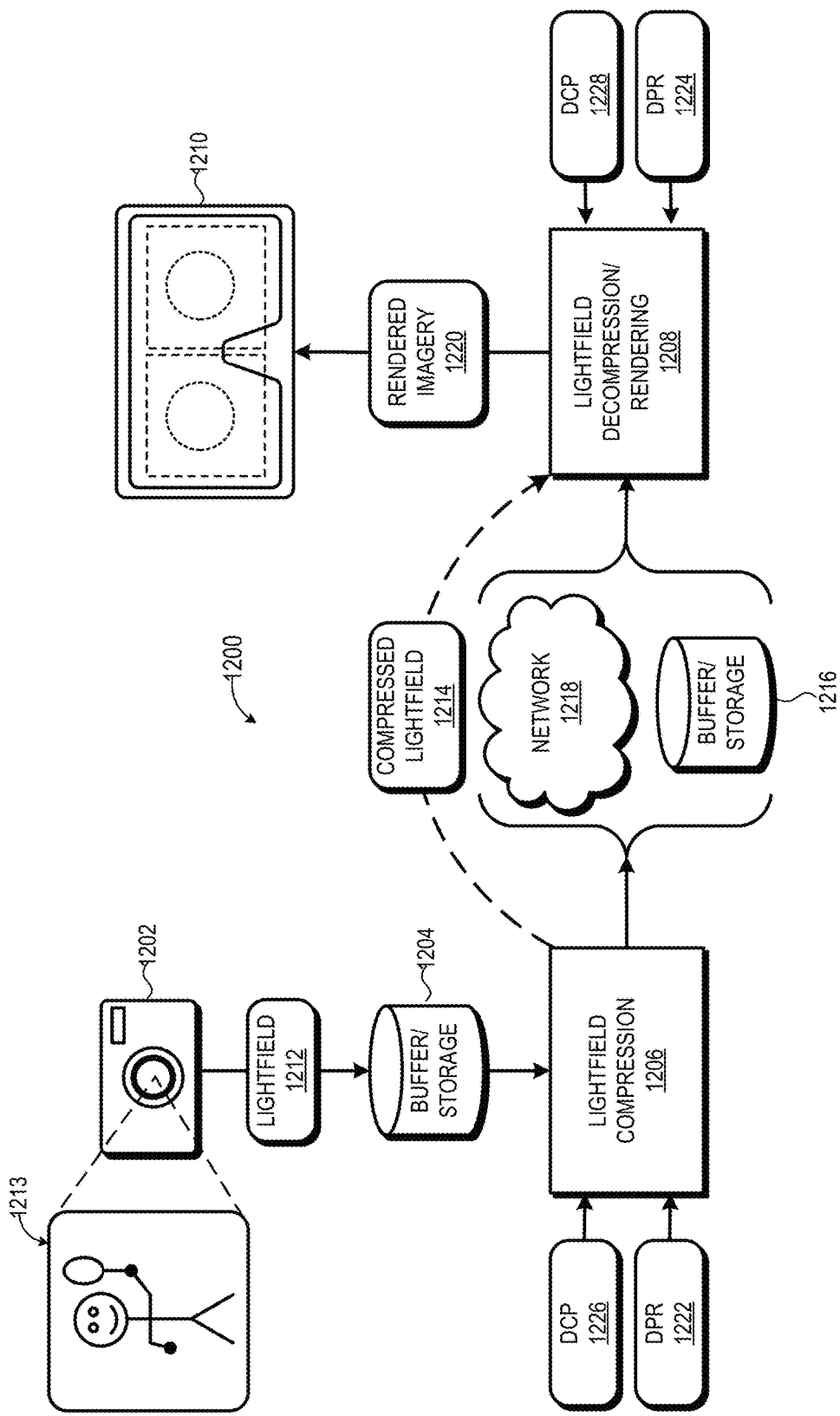
FIG. 12 is a block diagram of a lightfield-enabled display system in accordance with some embodiments.

The above methods can be implemented in a system or systems, optionally utilizing a network. FIG. 12 illustrates an example display system 1200. The display system 1200 includes a lightfield generation device 1202, a lightfield compression component 1206, a lightfield decompression/rendering component 1208, and a display device 1210.

In an example, the lightfield generation device 1202 generates or obtains a lightfield 1212 representing a scene 1213. To illustrate, the lightfield generation device 1202 can comprise, for example, a lightfield camera configured to capture the lightfield 1212, such as via a multiple camera rig configured to capture multiple images of the scene 1213 from different perspectives on a camera plane, with the resulting multiple images arranged in an 2D image array format, such as that illustrated by 2D image array 102 of FIG. 2. Alternatively, the lightfield generation device 1202 may comprise a graphics rendering device configured to generate the lightfield 1212 of a VR or AR implementation of the scene 1213 by rendering the images of the image array of the lightfield 1212 using lightfield rendering techniques, such as the contribution region technique described above. Whether generated through image capture or graphics rendering, the lightfield 1212 is buffered or otherwise stored in the storage device 1204 (for example, random access memory, a disc drive, etc.) for further processing.

The lightfield compression component 1206 can operate to compress the lightfield 1212 to generate a compressed lightfield 1214 represented by less data than the lightfield 1212, and thus better suited for efficient storage, transmission and processing.

In an example, the compressed lightfield 1214 is provided to the lightfield decompression/rendering component 1208 for further processing, whereby the compressed lightfield 1214 is provided by storing the compressed lightfield 1214 in a storage device 1216 accessible by both components 1206, 1208, by transmitting a representation of the compressed lightfield 1214 from the lightfield compression component 1206 to the lightfield decompression/rendering component 1208 via one or more networks 1218 or other data communication interconnects (e.g., data transmission cables), or the combination thereof.

To illustrate, the components 1206, 1208 may be implemented as components of a larger device, and the storage device 1216 may comprise system memory or a hard disc of the larger device. As another example, the components 1206, 1208 may be remote to each other, and the compressed lightfield 1214 is provided from the component 1206 to the component 1208 via a server located on the network 1218.

In a further example, the lightfield decompression/rendering component 208 can operate to identify a view of the scene 1213 to be displayed at the display device 1210, and from this identified view can identify which tiles of which images of the compressed lightfield 1214 are to be used to render imagery representative of the view (that is, which image tiles are "visible" in the identified view). The lightfield decompression/rendering component 1208 can access the identified image tiles from the compressed lightfield 1214 and decompresses the tiles to generate decompressed image tiles. From the decompressed image tiles, the lightfield decompression/rendering component 1208 can render one or more display images (rendered imagery 1220), which are provided to the display device 1210 for display.

To illustrate, in some embodiments the display device 1210 comprises a head mounted display (HMD) device, and the view of the scene 1213 to be rendered is based on the current pose of the HMD device relative to the coordinate frame of reference of the scene 1213. With this pose identified, the lightfield decompression/rendering component 1208 identifies the tiles of the compressed lightfield 1214 that represent imagery visible from the given pose, decompresses the identified tiles, renders a left-eye image and a right-eye image from the decompressed tiles, and provides the left-eye image and right-eye image to the HMD device for concurrent display so as to provide a user of the HMD a 3D view of the scene 1213.

In some implementations, the lightfield decompression/rendering component 1208 is implemented on a mobile device or other device with relatively limited processing, storage, or transmission resources. Accordingly, to facilitate efficient processing of the compressed lightfield 1214 for use in generating the rendered imagery 1220, the lightfield compression component 1206 utilizes one or more lightfield compression techniques, such as disparity predicted replacement (DPR) compression technique 1222, to reduce the amount of data required to represent the compressed lightfield 1214 as provided to the lightfield decompression/rendering component 1208.

The lightfield compression component 1206 may utilize one or more other compression techniques in addition to the DPR compression technique 1222, and the lightfield decompression/rendering component 1208 may utilize one or more complementary decompression techniques in addition to the DPR compression technique 1222. As an example, the lightfield compression component 1206 can employ a disparity compensated prediction (DCP) compression process 1226 and the lightfield decompression/rendering component 1208 can employ a corresponding DCP decompression process 1228.

Figure 13:
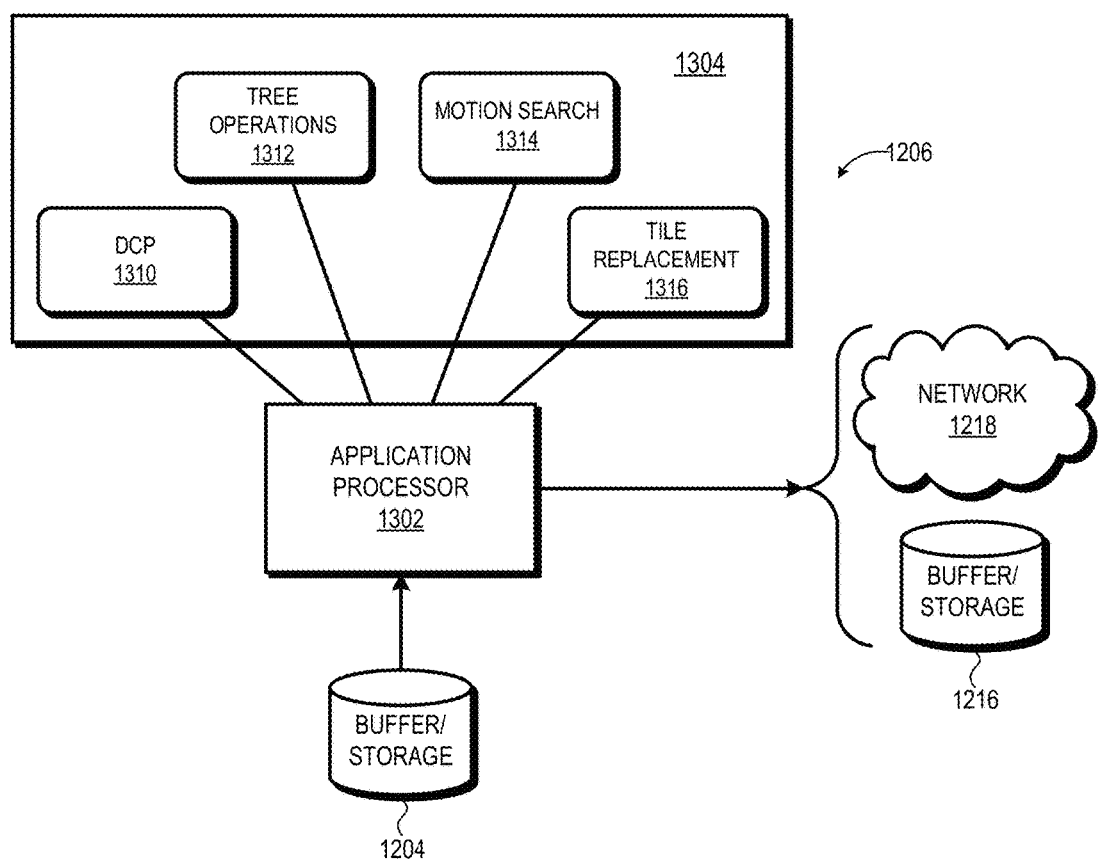
FIG. 13 is a diagram illustrating an example implementation of a lightfield compression device of the display system of FIG. 12 in accordance with some embodiments.

FIG. 13 illustrates an example hardware implementation of the lightfield compression component 1206 in accordance with at least some embodiments. In the depicted example, the lightfield compression component 1206 includes an application processor 1302 having an interface coupled to a non-transitory computer-readable storage medium 1304, an interface coupled to the storage device 1204, and interfaces coupled to one or both of the network 1218 and the storage device 1216. The application processor 1302 may comprise one or more central processing units (CPUs), graphics processing units (GPUs), or combinations thereof. The computer-readable storage medium 1304 includes, for example, one or more random access memories (RAMs), one or more read only memories (ROMs), one or more hard disc drives, one or more optical disc drives, one or more Flash drives, and the like.

The computer-readable storage medium 1304 stores software in the form of executable instructions configured to manipulate the application processor 1302 to perform one or more of the processes described herein. To illustrate, this software may include, for example, a DCP module 1310 to perform DCP encoding processes, a tree operations module 1312 to perform the binary tree generation and traversal processes, a motion search module 1314 to calculate the DDV for each reference tile on the basis of one or more motion search processes, and a tile replacement module 1316 to perform the selective tile elimination processes.

Figure 14:
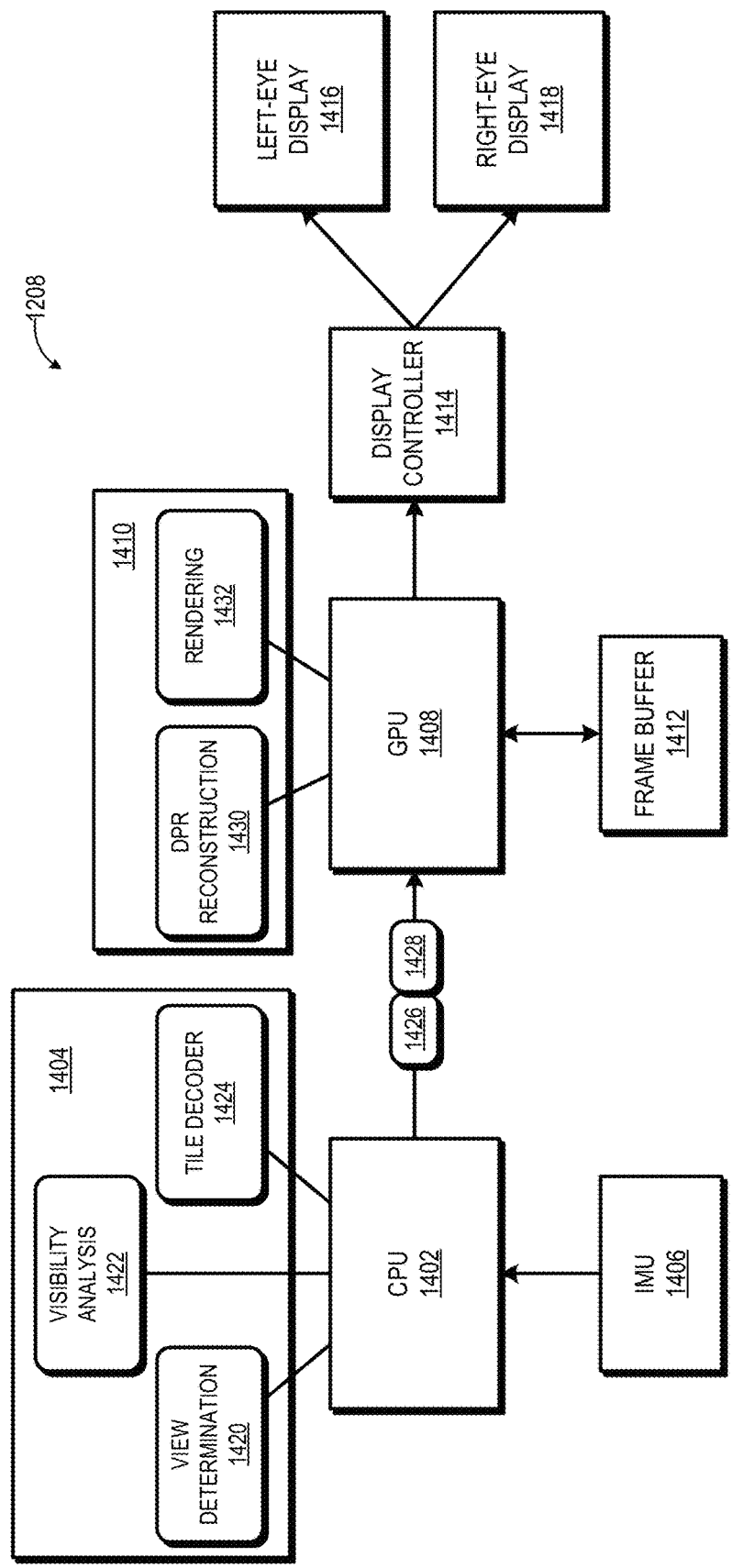
FIG. 14 is a diagram illustrating an example implementation of a lightfield decompression/rendering device of the display system of FIG. 12 in accordance with some embodiments.

FIG. 14 illustrates an example hardware implementation of the lightfield decompression/rendering component 1208 in accordance with at least some embodiments. In the depicted example, the lightfield decompression/rendering component 1208 includes a CPU 1402 having an interface coupled to a non-transitory computer-readable storage medium 1404 and an interface coupled to an inertial measurement unit (IMU) 1406, and interfaces coupled to one or both of the network 1218 and the storage device 1216 (not shown in FIG. 14). The lightfield decompression/rendering component 1208 further includes a GPU 1408 having an interface coupled to the CPU 1402, an interface coupled to a non-transitory computer-readable storage medium 1410, an interface coupled to a frame buffer 1412, and an interface coupled to a display controller 1414. The display controller in turn is coupled to one or more display panels, such as a left-eye display panel 1416 and a right-eye display panel 1418 of a HMD device.

In at least one embodiment, the workloads of the lightfield decompression process and rendering process are split between the CPU 1402 and the GPU 1408. To illustrate, the computer-readable storage medium 1404 stores software in the form of executable instructions configured to manipulate the CPU 1402 identify and DCP-decode (on demand) the lightfield tiles to render imagery representative of a particular view of a scene, while the computer-readable storage medium 1410 stores software in the form of executable instructions configured to manipulate the GPU 1408 to reconstruct any eliminated tiles needed to render the imagery, and then render the imagery using the accessed and reconstructed tiles. To illustrate, the CPU-side software can include a view determination module 1420 to determine the pose of the HMD device 1210 (FIG. 12) via the IMU 1406 and from the pose determine the current view into the scene 1213, a visibility analysis module 1422 to identify a set of image tiles of the compressed lightfield 1214 that are "visible" from the current view or otherwise are to render imagery of the scene 1213 from the current view as described above, and a tile decoder module 1424 to access those tiles of the set that are present in the compressed lightfield 1214, DCP decode them, and provide the present tiles (e.g., tile 1426) to the GPU 1408.

In an example implementation of the contribution region methods, the lightfield tiles can be sent to the GPU and the disk geometry can be sent as shader variables to be used to determine per-fragment weight or contribution factor. A selection of which lightfield tiles to render can be made by the CPU. More specifically, efficient GPU implementation can be accomplished by passing the tiles quads as the geometry to the GPU. The position and shape of the disk is passed as shader arguments. Then projective texturing is used to texture the tile. An intercept of the ray from the eye to the shade point on the tile with the disk or contribution region is used to determine the weight for that sample.

EXAMPLE

A method of rendering images using contribution regions is compared to a method using a triangular mesh with barycentric interpolation. For purposes of the test, the same lightfield including camera positions and camera views is used when implementing both methods.

Table 1 illustrates the render times per frame for each method on different devices.

TABLE 1

Render Times

| Device | Render Times (ms) | |
|---|---|---|
| | Contribution Regions | Mesh |
| HTC10 | 43.213 | 58.1638 |
| Nexus 6P | 108.724 | 157.245 |
| Workstation | 19.0467 (15.2*) | 16.1767 |

*adjusting the contribution region radius provides better performance will maintaining full coverage of the contribution regions.

As illustrated in TABLE 1, considerable performance gains are found when using the contribution regions method, particularly when implemented on mobile devices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for rendering a view from a lightfield, the method comprising:
    identifying a ray associated with a portion of the view;
    selecting a level of detail for rendering the view;
    selecting a subarray of an array of cameras, the subarray having a density of camera positions based on the selected level of detail;
    selecting a set of camera views from a plurality of camera views of the subarray representing the lightfield based on the level of detail for rendering the view and an intersection point of the ray with a plane, each camera view having an associated contribution region disposed on the plane, a size of the associated contribution region based on the density of camera positions of the subarray, the associated contribution region overlapping contribution regions associated with other camera views of the set of camera views at the intersection point; and
    determining a characteristic of the ray based on a contribution factor for each camera view of the set of camera views, the contribution factor determined based on a relative position of the intersection point within the associated contribution region.

2. The method of claim 1, wherein the plane is a camera plane associated with an array of camera positions, each camera view having an associated camera position having the associated contribution region.

3. The method of claim 2, wherein the associated camera position is disposed at a center of the contribution region.

4. The method of claim 2, wherein the plurality of camera views is associated with a focal plane.

5. The method of claim 4, further comprising selecting a relative distance between the camera plane and the focal plane.

6. The method of claim 1, wherein the portion of the view is a pixel or a set of pixels.

7. The method of claim 1, wherein the characteristic is a color value.

8. The method of claim 1, wherein the contribution region is in a shape of a circular or elliptical disk in the plane.

9. The method of claim 1, wherein the contribution region has a polygonal shape in the plane.

10. The method of claim 1, wherein the contribution factor declines with radial distance of the intersection point from a center of the contribution region.

11. The method of claim 10, wherein the contribution factor declines linearly with distance from the center.

12. The method of claim 10, wherein the contribution factor declines in a Gaussian manner with distance from the center.

13. The method of claim 1, wherein the characteristic is determined based on a sum of contributions of the set of camera views, a contribution of each camera view of the set of camera views determined based on a product of a characteristic of a portion of each camera view and the contribution factor.

14. The method of claim 13, wherein the contribution factor is normalized using a sum of contribution factors of the set of camera views.

15. The method of claim 1, further comprising:
    for each portion of the view, identifying the ray, selecting the set of camera views, and determining the characteristic of the ray;
    rendering the view based on characteristics of the rays; and
    displaying the view on a display device.

16. A system for rendering a view from a lightfield, the system comprising
    a display device;
    a storage device storing the lightfield represented by a plurality of camera views;
    computational circuitry in communication with the display device and the storage device, the computational circuitry to:
        identify a ray associated with a portion of the view;
        select a level of detail for rendering the view;
        select a subarray of an array of cameras, the subarray having a density of camera positions based on the selected level of detail;
        select a set of camera views from a plurality of camera views of the subarray representing the lightfield based on the level of detail for rendering the view and an intersection point of the ray with a plane, each camera view having an associated contribution region disposed on the plane, a size of the associated contribution region based on the density of camera positions of the subarray, the associated contribution region overlapping contribution regions associated with other camera views of the set of camera views at the intersection point; and
        determine a characteristic of the ray based on a contribution factor for each camera view of the set of camera views, the contribution factor determined based on the relative position of the intersection point within the contribution region.

* * * * *